Patented Apr. 3, 1928.

1,664,678

UNITED STATES PATENT OFFICE.

HANS G. GRIMM, OF MUNICH, GERMANY.

PROCESS OF STABILIZING CHEMICAL SUBSTANCES.

No Drawing. Application filed April 29, 1924, Serial No. 709,914, and in Germany May 5, 1923.

This invention has reference to a process of increasing the resistability against chemical and physical and other influences of various chemical substances, particularly of crystallized structure by a novel kind of combustion of the chemical substances (compounds) with resisting substances, likewise preferably of crystallized structure, and it also refers to the products obtained by such process and method of treatment, and it is one of the important objects of my invention to so treat, for instance, substances which are soluble in water or acids or are apt to be readily changed by atmospheric influences, that they become proof from such attacks or substantially insoluble, thereby producing a new class of substances which may be industrially utilized for a variety of uses. The new process according to this invention is broadly based upon the adaptability of various substances of producing mixed crystals or layer of crystals or laminated crystals with other substances. Of the different possible means of formation of such crystals those combinations of two or more substances have been found particularly suitable according to my invention in which one or more readily soluble or readily decomposable substances which, for the sake of clearness and brevity of illustration, I will call "unstable substances" are combined with one or a plurality of more difficulty soluble, and not readily attacked substances which will be referred to hereinafter as "stable substances," so as to form mixed or laminated crystals.

The properties of the well known mixed crystals usually result from an addition of the properties of their components. Thus, for instance the mixed crystals of KCl and KBr possess indices of refraction and so-called interatomic distances in the space lattice of the crystal intermediate the values obtained for the unmixed constituents. The space lattice of the crystal is the spacial arrangement of atoms in the crystal, the character of the arrangement is determinable, for instance, by the defraction method of Laue or by the X-ray spectrascope. Now, it has been ascertained that such kinds of mixed crystals may also be obtained in which certain properties of one of the components is strongly prevalent, while other properties are almost exclusively dependent upon the second component. In accordance with the process of this invention this observation is utilized by causing less stable substances which are particularly distinguished by a certain valuable property, thus for instance, by their coloration, to be, so to speak, introduced into the crystal-grate of a stable substance, and in such a manner that the resulting product presents the valuable property of the first component, its coloration, and combined with the permanency of the second component. By this means I am enabled to obtain valuable dyes and pigments which could not be produced in any other manner by the union of easily soluble and, moreover, sensitively colored substances with other substances which, by themselves, need not necessarily possess any definite coloration. In the same manner colored, otherwise stable substances may be combined with other stable substances to form pigments and dyes. The process in its broad aspects may for instance be carried out as follows:—

Permanganate of potash $KMnO_4$ is a dark violet substance which on account of its solubility and chemical instability cannot be employed as a pigment. On the other hand, sulphate of barium $BaSO_4$ is a white, or practically colorless substance which is substantially insoluble in water and other solvents. These two substances of chemically widely different properties may be united to form mixed crystals, because they possess the identical chemical type of structure $XYZ_4$, the same type of "space lattice," and similar interatomic distance in the lattice of the crystal, which conditions in accordance with recent investigations are both necessary as well as sufficient for the formation of mixed crystals. Upon the precipitation of sulphate of barium from an aqueous solution and in the presence of permanganate of potash in solution mixed crystals of the sulphate of barium with permanganate of potash are formed $= BaSO_4 + KMnO_4$. If it is desired to produce higher concentrations of the potassium permanganate in the mixed crystals, it is preferable to start with two solutions one of which is diluted in regard to $Ba++$-ions, and is concentrated in regard to potassium permanganate, while a second solution is dilute in regard to $SO_4--$-ions and concentrated in regard to potassium permanganate, both solutions being then united with constant stirring. In accordance with the conditions prevailing during the formation a more or less intensely violet colored salt is obtained in which the $KMnO_4$ is protected by the $BaSO_4$, so that even with a prolonged treatment with hot water or with substances which in the absence of the BaSO₄ would dissolve or destroy the KMnO₄, the coloration remains completely unchanged. The salt may be washed, and may be further treated and dried in the manner hereinafter described.

Broadly considered the general way of obtaining stable mixed crystals according to this invention consists in causing the mixed crystals to be formed in solution which contain the substances to be protected in sufficient concentration, one or more of the stable protecting substances being formed in such solutions. A particularly advantageous procedure is the formation of the mixed crystals in solution which in regard to the ions from which the difficultly soluble substance or substances are formed, possess a lower concentration than in regard to the ions from which the more readily soluble components of the mixed crystals originate. It is immaterial for the success of the process by which of the different ways of procedure that are possible according to my invention the mixed crystals are obtained. I may also proceed by causing the said crystals to be formed from the fused substance or substances to be protected or of their components with one or more stable protecting substances or the substances from which the latter are to be formed. The said crystals may also be formed by the intimate merely mechanical rubbing together, particularly at elevated temperatures, or by effecting the union from the gaseous phase or by the action of mixed gases upon solid or liquid substances or by electrolysis and by other equivalent methods.

The protecting action of the stable components of the mixed crystals does not extend to the outermost layers of the individual crystals, and in view thereof the unstable particles from the superficial layers may be removed by chemical or mechanical solvents. By means of this subsequent treatment substances are obtained which in regard to solvents or chemical reagents behave substantially like the stable component without however losing certain valuable properties of the unstable components.

In the example hereinbefore mentioned the K+, and MnO⁻₄ ions are removed from the superficial layers by the treatment with solvents or reducing agents, while the inner portions by the protecting action of the remaining layers of barium-sulfate remain unattacked. The product obtained may then be used as a pigment, and as such may be safely mixed with binding agents or with other pigments which would normally be liable to react with MnO₄⁻ ions.

The protecting action may be increased, if the space gaps obtained in the crystals by the washing are filled with substances containing ions which are adapted to act as protecting substances. In the example above mentioned the washing is preferably effected with water containing Ba++-or SO₄⁻⁻-ions, that is a solution of Na₂SO₄ or BaCl₂, by which means, aside from the decrease of the solubility of the barium-sulphate an aggregation or introduction of Ba++ -or SO₄⁻ -ions is effected.

The protecting action may, if desired, be further increased by causing the mixed crystals to continue growing in solutions containing protecting substances, if required. By this means laminated crystals are obtained in which, therefore, the interior portion is formed by a mixed crystal, while the outer portions are formed by a protecting substance. The operator is therefore at liberty to increase the protecting layer in any desired manner. This is of particular importance if the content of unstable constituents in the mixed crystals exceeds the limit at which the protecting action of the stable substance or substances is effective. The production of the laminated crystals or crystals in layers, instead of taking place upon a mixed crystal may also be effected upon pure substances which it is desired to protect. The formation of the laminated crystals makes it possible in this case as in the previous instance, to obtain perfectly stable products without interfering with the valuable properties of the unstable substances.

An important utilization of the process consists for instance in the production of stable coloring agents from such substances which by themselves are not stable. By varying the conditions of manufacture of the mixed crystals, particularly the concentration of the solutions, fused masses, gas mixtures and the like employed the concentration of one or more ions in the mixed crystals may be varied and adjusted in any desired manner, and at a certain predetermined ratio. One is thereby enabled to produce exactly graduated shades and degrees of certain properties of the substances, for instance of the color.

Among other utilizations of the process of my invention I may refer, for instance, to the manufacture of fertilizers in which readily soluble and extractable fertilizing agents may be stabilized by the production of mixed crystals with other substances which, of course, may likewise present fertilizing agents. From this kind of mixed crystals the readily soluble substance is only absorbed gradually, in the nascent state, in the soil in proportion to the decomposition of the more stable constituent.

Another utilization of the principle of the invention consists in the manufacture of mixed crystals containing one or more substances adapted for the carrying out of chemical reactions, or which are adapted to liberate or separate out such substance or substances in exactly measured or measurable quantities and with measurable and computed velocity, so that in this manner it becomes possible to control and regulate the time and progress of chemical reactions.

My new process will be further illustrated with reference to the following examples of application of the invention to various practical requirements.

1. With constant stirring and at the temperature of the room 1500 cc. of fourth normal $\frac{n}{4}$ barium nitrate = 98,0 grammes and 750 cc. $\frac{n}{2}$ potassium sulphate = 65.3 grammes are mixed all at once with a solution containing 84 grammes potassium hydrate and 7.81 grammes manganate of potash. A brilliant violet precipitate is immediately formed consisting of mixed crystals of barium-sulphate and barium manganate which are rapidly deposited, and which are separated from the bluish green mother liquor by repeated decantation and washing with water, are sucked off and suspended for a short time in dilute solution of sulphurous acid, by which means the product is freed from the pyrolusite or hyperoxid of manganese, and is then washed again and dried. The powder obtained is insoluble in acids and bases, and not acted upon by strong oxidizing and reducting agents, so that it has lost the properties of pure $BaMnO_4$, and constitutes a very valuable pigment, lake and lacquer color.

2. 10 grammes of ordinary salt and 1 gramme solid caustic potash are fused together in a crucible. The crucible is allowed to cool slowly in a fire-brick furnace, the fused mass is broken and rubbed and disintegrated in a mortar. The mixed crystals formed by the melting process do only partially become disintegrated upon cooling and the white powder shows particularly the properties of sodium chloride. It is not hygroscopic, and yields only a part of the KOH to alcohol of 96%, the rest is protected by the Na, Cl crystals. The compound produced may be used for chemical purposes, when it is required to cause potassium hydrate to act very gradually in the nascent state.

The pigments produced in accordance with the statements above enumerated may be used for the coloring of yarns, threads, fabrics or of similar material, and it is possible to combine the coloring agent very durably with the fiber, so as to obtain a fast coloration. This object of the fixing of the color to the fibers may be produced in a most advantageous manner by causing the colored mixed crystals to be formed directly upon the fiber only. In case the mixed crystals are produced from solutions, the formation of the crystals upon the fiber may be arrived at by impregnating the fiber with one or part of the components, the material thus prepared being then immersed into solutions which contain the other components. By completely impregnating the fiber with one or a portion of the components the mixed crystals are formed in intimate contact with the fiber and adhere very fast to the same and within the fiber. Before treating the fiber with the constituents of the mixed crystals to be produced it may be prepared with true solutions or colloidal solutions of inorganic or organic substances which serve, so to speak, as a means for the protection of the fiber, as a mordant or for the special fixing of the pigment.

As a further illustration of the last mentioned utilization of the invention I may mention the following example of this application thereof:—A linen fabric to be dyed is impregnated with a solution of barium nitrate for some minutes which has been saturated while hot; it is then freed from the main portion of the adhering solution by short pressure, and is immersed into a bath containing about ¼ (one fourth) gram molecule of potassium sulphate and 1/40 (one-fortieth) molecule of potassium-manganate, and 1 to 2 gram molecules of caustic potash per liter. The fabric is allowed to remain in the bath for ¼ to 1 minute, it is then quickly washed with much water, and the precipitated peroxide of manganese is then removed by washing with aqueous sulphurous acid or with any of the other usual reducing agents. After renewed washing and drying the fabric tissue is ready for use. Within the fiber mixed crystals of barium sulphate and barium manganate of sub-microscopic size have been formed which impart to the entire tissue their violet individual color, and in a uniform manner. From the chemical point of view it should be pointed out that it is entirely novel that it has become possible thereby to make use of an easily decomposable colored substance which otherwise attacks the fiber very much, such as a solution of potassium manganate, as a pigment for a fabric tissue without any injury to the fiber. As a particularly important advantage from the point of view of the manufacturer and practitioner it should be pointed out that the colorations thus obtained are absolutely proof to light, and that they are even more resisting against the attacks of any chemical agents than the material to be dyed itself.

The coloring process may be repeated several times, if required, for the deepening of the coloration or shade.

As applied to fibrous material I may also proceed for instance as follows. A paste of paper pulp is heated for about half an hour with a solution of barium nitrate saturated at about 60 degrees C., the mass is then squeezed out for a short time and treated with a solution of potassium permanganate for a short time which is saturated in the cold, and containing about 1/100 (one hundredth) gram molecule of potassium sulphate per liter. The paper pulp is then sucked off, and is treated as in the former example, with water and reduction agent; it constitutes a fibrous mass of uniform pink coloration which is adapted to serve as a starting material for the manufacture of colored kinds of paper and for other purposes. The pigment consists in this instance of mixed crystals of barium-sulphate and potassium permanganate which fixedly adhere to the fiber in submicroscopic distribution. The fact that the pigments actually consists of mixed crystals may be proved by combining the solutions mentioned in the absence of fibrous material, and investigating the precipitate with the microscope; absolutely homogenius violet reddish minute crystals are then observed which otherwise behave like barium-sulphate.

The procedure is substantially the same, if other substances are to be colored. As in the previous examples the tissue or other fabric to be dyed may be impregnated with the solution of one of the components, the mixed crystals being then produced in the fiber by treatment with other solutions. The order of operations should then, of course, be selected in such a manner that the fabric is brought in contact as the last step only, and only for a short time with the component or components attacking the fiber. The production of the mixed crystals is not confined to the precipitation thereof from solutions, and, as explained above, and in accordance with the principles of the invention, the coloring of the fabric may also be effected by treating it with fused masses, with gases or by the electrolytic treatment of the previously suitably prepared tissues or fabrics or by a combination of these processes. In all cases it is of importance that the mixed crystals are caused to come in intimate contact with the fiber, and with this point in view, they are preferably produced within or directly upon the fiber itself. The process is not subject to any limitations as regards the nature of the substances and articles to be colored or dyed; it may be used, besides for the fibrous material above mentioned, in connection with cotton, wool, silk, leather, hides, asbestos, wood or any other suitable kind of material.

It should also be understood that the invention is by no means confined to the particular ways and means of procedure hereinbefore set forth merely by way of exemplification of the principles thereof, but it is susceptible of such changes, modifications and alterations, as will suggest themselves to the operating expert to better adapt the invention to varying existing conditions, and without deviating from the spirit of the invention, as set forth in the claims hereunto appended.

I claim:—

1. The process of modifying a crystalline chemical compound to suppress undesirable physical and chemical characteristics thereof and to give it desirable properties which comprises combining the compound whose undesirable properties are to be suppressed with another crystalline chemical compound of the same chemical type and of the same crystal lattice structure and having the properties it is desired to have associated with the first mentioned compound to form mixed crystals comprising the two compounds, said mixed crystals exhibiting the desirable properties of both compounds but having the undesirable properties of the first mentioned compound suppressed.

2. The process of coating and impregnating fibrous material which comprises impregnating the material with a solution of a crystalline chemical compound and thereafter treating the impregnated material with a solution of a different crystalline chemical compound, the crystalline compounds being so chosen that mixed crystals are formed in and on the fibrous material, the said mixed crystals being the product of combining, during the treating step, at least two crystalline chemical compounds of the same chemical type and having similar crystal lattice structure.

3. The process of coloring fibrous material which comprises impregnating such material with a crystalline chemical compound and thereafter treating the impregnated material with a solution of a second crystalline compound to form, in and on the material, colored mixed crystals, one of said compounds being colored and the mixed crystals being the product of combining said colored compound, during the treating step, with another crystalline compound of the same chemical type and same crystal lattice structure.

4. Fibrous material colored by mixed crystals, said mixed crystals being the product of combining on the material, a colored crystalline chemical compound with another crystalline chemical compound, each of said compounds being of the same chemical type and having similar crystal lattice structure.

In testimony whereof I hereunto affix my signature.

DR. HANS G. GRIMM.